(12) United States Patent
Kline et al.

(10) Patent No.: US 10,591,309 B2
(45) Date of Patent: Mar. 17, 2020

(54) AUTONOMOUS VEHICLE-BASED GUIDED TOUR RULE SELECTION

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/782,329

(22) Filed: Oct. 12, 2017

(65) Prior Publication Data
US 2019/0113362 A1 Apr. 18, 2019

(51) Int. Cl.
G01C 22/00 (2006.01)
G05D 1/00 (2006.01)
G01C 21/36 (2006.01)
G06F 3/0482 (2013.01)
G01C 21/34 (2006.01)
G06N 5/04 (2006.01)
G06Q 10/04 (2012.01)

(52) U.S. Cl.
CPC ....... *G01C 21/3682* (2013.01); *G01C 21/343* (2013.01); *G01C 21/3484* (2013.01); *G06F 3/0482* (2013.01); *G06N 5/04* (2013.01); *B60K 2370/695* (2019.05); *G06Q 10/047* (2013.01)

(58) Field of Classification Search
CPC .. G01C 21/3682; G01C 21/343; G01C 21/36; G01C 21/3658; G06F 3/0482

USPC .................................. 701/25, 210, 414, 425
See application file for complete search history.

(56) References Cited

U.S. PATENT DOCUMENTS

| 8,620,532 | B2 | 12/2013 | Curtis et al. |
| 9,541,405 | B2 | 1/2017 | An et al. |
| 10,209,981 | B2 | 2/2019 | Hirshberg et al. |
| 10,281,289 | B2 | 5/2019 | Nevrekar et al. |
| 2010/0312464 | A1 | 12/2010 | Fitzgerald et al. |
| 2010/0324817 | A1* | 12/2010 | Hansen ............... G01C 21/3415 701/414 |
| 2015/0276419 | A1* | 10/2015 | Hashem ................ G01C 21/20 701/425 |
| 2016/0003621 | A1 | 1/2016 | Koenig et al. |
| 2018/0299289 | A1* | 10/2018 | Hill ...................... G01C 21/362 |

OTHER PUBLICATIONS

Anonymous, "Best for Dodging Traffic: Waze", URL:<http://www.techlicious.com/tip/best-navigation-apps/>, 10 pages.

(Continued)

*Primary Examiner* — Mahmoud S Ismail
(74) *Attorney, Agent, or Firm* — Cantor Colburn LLP; Tihon Poltavets

(57) ABSTRACT

An operation of an autonomous vehicle is provided. The operation includes receiving first input reflective of a route to be traveled and second input reflective of trip experience preferences and searching for driving experience data related to the route. The operation further includes aggregating the first and second inputs with the driving experience data and plotting a travel plan incorporating the aggregated first and second inputs and the driving experience data.

20 Claims, 4 Drawing Sheets

(56) References Cited

OTHER PUBLICATIONS

Anonymous, "Driverless car market watch", URL<http://www.driverless-future.com/?page_id=774>, 13 pages.

Anonymous, "Selfdrivingcar", URL <https://www.google.com/selfdrivingcar/how/>, 2 pages.

Anonymous, "Special Report: The Self-Driving Car", IEEE Spectrum, URL<http://spectrum.ieee.org/static/the-self-driving-car>, 4 pages.

Brachmann, "Google continues to march forward on autonomous vehicle development", 2015, URL<http://www.ipwatchdog.com/2015/07/29/google-continues-to-march-forward-on-autonomous-vehicle-development/id=59996/>, 10 pages.

EmTech Digital, "Autonomous Vehicles and the Passenger Experience", 2015, Video URL<:http://events.technologyreview.com/emtech/digital/15/video/watch/bts-iagnemma/>, 3 pages.

Grzybek et al. "Mitigating Flash Crowd Effect Using Connected Vehicle Technology", Preprint submitted to Journal of LATEX Templates, 2015, 40 pages.

Lafrance, Adrienne "How Self-Driving Cars Will Threaten Privacy", The Atlantic, dated Mar. 21, 2016; downloaded Jul. 18, 2016; http://www.theatlantic.com/technology/archive/2016/03/self-driving-cars-and-the-looming-privacy-apocalypse/474600/ ; 8 pgs.

Lazzaro, "Self-Driving Cars Will Cause Motion Sickness 'Often' to 'Always,' Study Finds", 2015, URL<:http://observer.com/2015/06/self-driving-cars-will-cause-motion-sickness-often-to-always-study-finds/>, 6 pages.

Li, Jie et al., "Exploring Personalized Travel Route Using POIs", International Journal of Computer Theory and Engineering, vol. 7, No. 2, Apr. 2015; pp. 126-131.

Nushi et al., "Crowd Access Path Optimization: Diversity Matters", Association for the Advancement of Artificial Intelligence, 2015, 10 pages.

Shen et al., "Managing Autonomous Mobility on Demand Systems for Better Passenger Experience", Department of Informatics University of California, Irvine, CA92697, USA, 2015, 16 pages.

Su, "CrowdPlanner: A Crowd-Based Route Recommendation System", University of Queensland, Australia, 2013, 9 pages.

Yin, Huagang et al., "Trip Mining and Recommendation from geo-tagged Photos", 2012 IEEE International Conference on Multimedia and Expo Workshops, http://www.cmlab.csie.ntu.edu.tw/~zenic/Data/Download/ICME2012/Workshops/data/4729a540.pdf; pp. 540-545.

Zhang et al., "Where to: Crowd-Aided Path Selection", Hong Kong University of Science and Technology, Hong Kong, China, 2013, pp. 2005-2016.

\* cited by examiner

AUTONOMOUS VEHICLE-BASED GUIDED TOUR RULE SELECTION

BACKGROUND

The disclosure relates generally to autonomous vehicles.

When people drive from one place to another, they can often control their vehicle according to various choices they make in order to better enjoy the traveling experience. For example, while driving from point A to point B, a driver may select a musical selection, an interior temperature of the car, a travel speed, whether to open or close windows or roof tops, whether to halt his trip and take some time to read, eat, drink or watch something of interest. That is, a driver moving at a constant high speed with the windows open will have a much different experience than a driver moving slowly with the windows closed and stopping frequently to eat.

An autonomous vehicle (also known as a driverless car) is a vehicle that is capable of sensing its environment and navigating without human input. Before traveling commences, autonomous vehicles gather driving rules and move accordingly but will typically fail to take human interest programming into account in formulating a travel plan. In particular, an autonomous vehicle may consider road parameters, vehicle parameters, weather parameters and traffic conditions but will be otherwise unaware of points of human interest or recommended eateries along a given road.

SUMMARY

According to one or more embodiments, a processor-implemented method of operating an autonomous vehicle is provided. The processor-implemented method includes receiving first input reflective of a route to be traveled and second input reflective of trip experience preferences and searching for driving experience data related to the route. The processor-implemented method further includes aggregating the first and second inputs with the driving experience data and plotting a travel plan incorporating the aggregated first and second inputs and the driving experience data.

According to one or more embodiments, a computer program product for operating an autonomous vehicle is provided. The computer program product includes a computer readable storage medium having program instructions embodied therewith. The program instructions are executable by a processor to cause the processor to receive first input reflective of a route to be traveled and second input reflective of trip experience preferences and search for driving experience data related to the route. The program instructions are executable by the processor to further cause the processor to aggregate the first and second inputs with the driving experience data and plot a travel plan incorporating the aggregated first and second inputs and the driving experience data.

According to one or more embodiments, a system for operating an autonomous vehicle is provided. The system includes a processor and a memory storing program instructions for operating the autonomous vehicle. The program instructions are executable by a processor to cause the system to receive first input reflective of a route to be traveled and second input reflective of trip experience preferences and search for driving experience data related to the route. The program instructions are executable by the processor to further cause the system to aggregate the first and second inputs with the driving experience data and plot a travel plan incorporating the aggregated first and second inputs and the driving experience data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated

DETAILED DESCRIPTION

In view of the above, embodiments disclosed herein may include a system, a method and/or a computer program product that allows an autonomous vehicle to customize a travel experience based on selected preferences of a traveler riding in the autonomous vehicle. Such customization may include, for example, slowing down or stopping and opening or closing the vehicle windows at given locations.

Embodiments described herein are necessarily rooted in a processor and memory of the system to perform proactive operations to overcome problems specifically arising in the realm of autonomous vehicles not taking into account selected preferences of a traveler in setting up a travel plan. Thus, the present disclosure has technical effects and benefits of providing for an autonomous vehicle that is capable customizing a travel experience based on selected preferences of a traveler riding in the autonomous vehicle.

Figure 1:
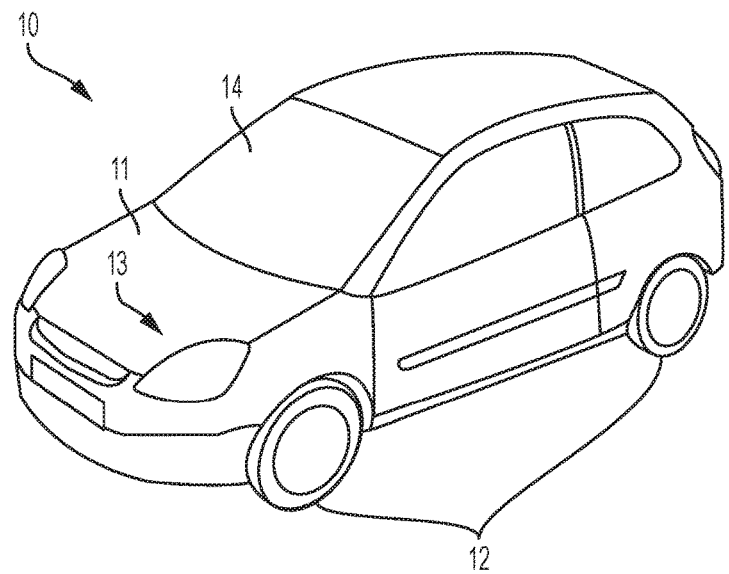
FIG. 1 is a side view of an autonomous vehicle in accordance with embodiments.

Turning now to FIG. 1, an autonomous vehicle 10 is provided. The autonomous vehicle 10 may be provided as a car as shown in FIG. 1 or as any other ground-based or flight capable vehicle. For purposes of clarity and brevity, however, the following description will relate only to the case of the autonomous vehicle 10 being provided as a car. As such, the autonomous vehicle 10 includes a vehicle frame 11, a set of steerable wheels 12 on which the vehicle frame 11 sits, an engine 13 which is configured to drive the wheels 12 and a cabin 14 defined by the vehicle frame 11. The cabin 14 may be configured to accommodate one or more passengers therein and includes several control elements which can be accessed by a driver or operator if necessary.

Figure 2:
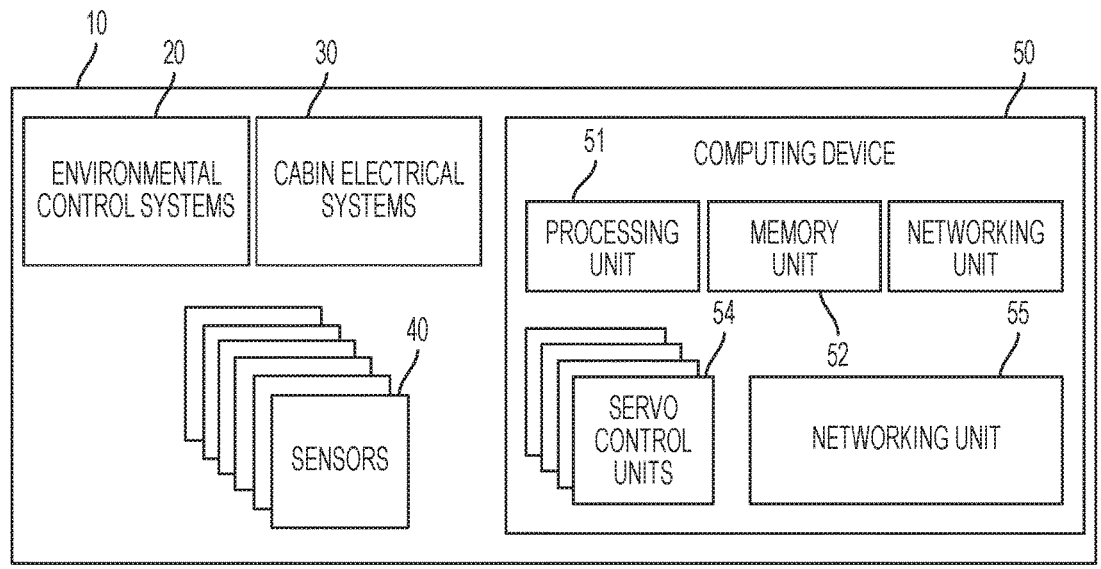
FIG. 2 is a schematic diagram of a computing device of the autonomous vehicle of FIG. 1 in accordance with embodiments.

With continued reference to FIG. 1 and with additional reference to FIG. 2, the autonomous vehicle 10 may further include various environmental control systems 20, cabin electrical systems 30, a plurality of sensors 40 distributed around the vehicle frame 11 and a computing device 50 among many other features. The various environmental control systems 20 may include, for example, heating, ventilation, and air conditioning (HVAC) systems as well as vehicle window opening and closing systems. The cabin electrical systems 30 may include vehicle status indicators and audio and visual (AV) systems. The plurality of sensors 40 include speed and attitude sensors, global positioning system (GPS) elements, cabin environmental sensors, etc. The computing device 50 may be housed in various positions about the vehicle frame 11 and includes a processing unit 51, a memory unit 52, a networking unit 53, one or more servo control units 54 and a networking unit 55.

The memory unit 52 includes various types of random access and read only memory, among other types of memory, and has executable or program instructions (hereinafter referred to as "program instructions") stored thereon. The program instructions, when executed by the processing unit 51 cause the processing unit to control various operations of the autonomous vehicle 10 as described herein on its own and/or by way of the one or more servo control units 54. As examples, the program instructions cause the processing unit 51 to control operations of the wheels 12 and the engine 13, the environmental control system 20 and the cabin electrical system 30 based at least in part on the readings of the plurality of sensors 40.

Figure 3:
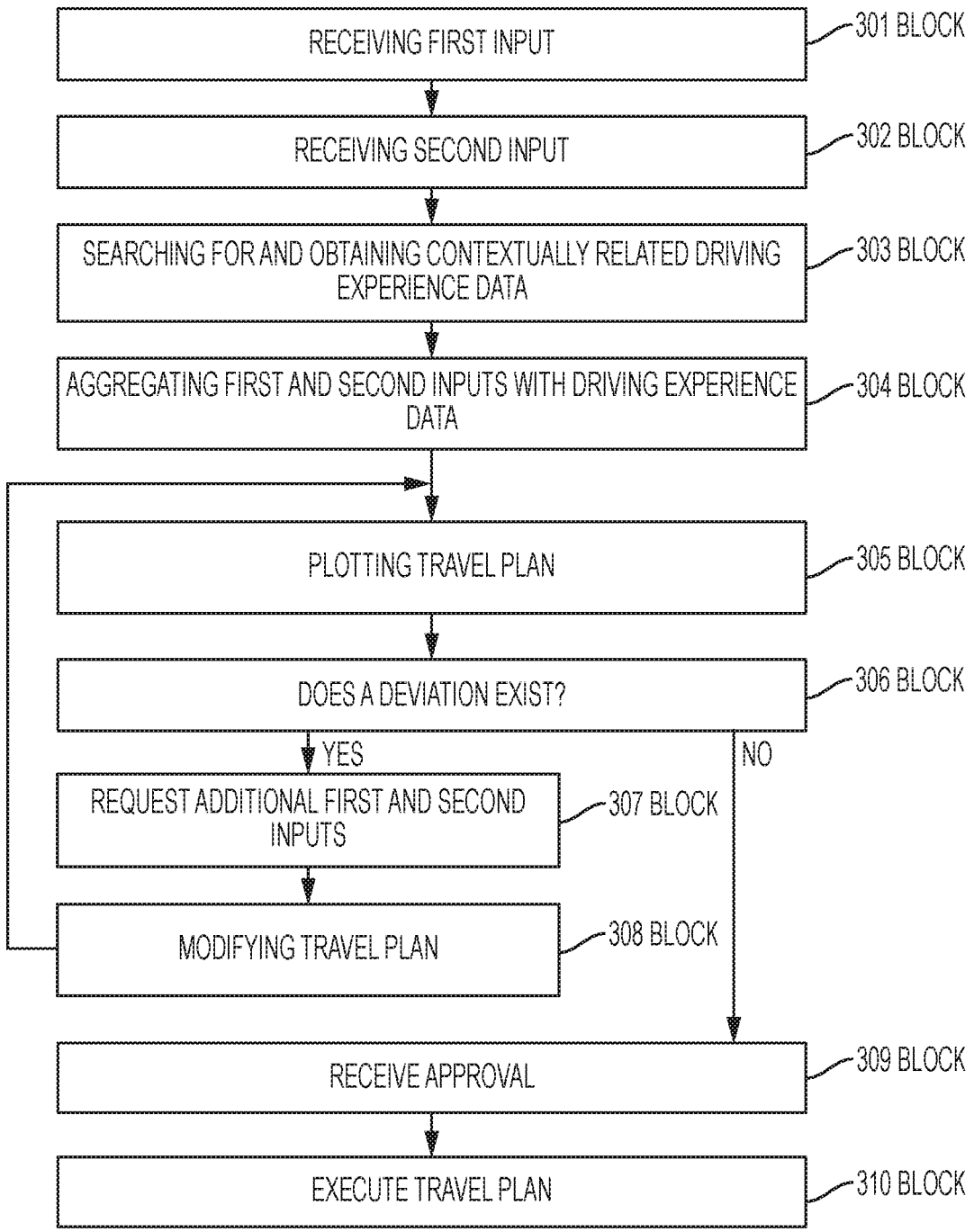
FIG. 3 is a flow diagram illustrating a method of operating an autonomous vehicle in accordance with embodiments.

In particular, with reference to FIG. 3, the execution of the program instructions by the processing unit 51 provides for a processor-implemented method for operating the autonomous vehicle 10.

As shown in FIG. 3, the processor-implemented method includes initially receiving first input from a passenger or owner of the autonomous vehicle 10 by way of commands entered into the computing device 50 (block 301) and receiving second input from the passenger or the owner by way of additional commands entered into the computing device 50 (block 302). The first input is reflective of a route to be traveled by the autonomous vehicle 10 for a given trip. The second input is reflective of trip experience preferences of the passenger or owner. The processor-implemented method further includes responsive engagement of the networking unit 53 by the processor 51 to access a cloud server (or another centralized or distributed source or database) in order to search for and obtain contextually related driving experience data of other vehicles that have traveled that route (block 303).

At a next point, the processor-implemented method also includes aggregating the first and second inputs with the driving experience data (block 304) and plotting a travel plan incorporating the aggregated first and second inputs and the driving experience data (block 305). Here, it is determined whether a deviation between the first or second inputs and the driving experience data exists (block 306). Such a deviation may be apparent in, for example, a selected route evidently passing by multiple points of interest which the passenger has exhibited interest in but skipping another one that multiple prior travelers have all visited and given positive feedback on. In these or other similar cases, the processor-implemented method will request at least one of additional first or second inputs by presenting additional options or recommendations to the passenger or owner in the form of lists or icons that can be selected for the purpose of modifying the travel plan being plotted (block 307). The processor-implemented method thus includes accordingly modifying the travel plan being plotted if any of those additional options are accepted (block 308).

Once the travel plan is plotted and potentially modified and once no further modifications are pending, the processor-implemented method will include receiving from the passenger or owner an approval (block 309) and correspondingly executing the travel plan (block 310).

Figure 4:
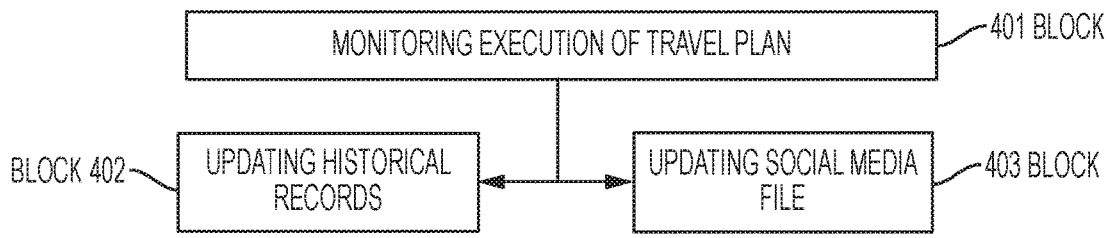
FIG. 4 is a flow diagram illustrating a method of operating an autonomous vehicle in accordance with further embodiments.

With reference to FIG. 4, additional embodiments of the processor-implemented method are illustrated. As shown in FIG. 4, the processor-implemented method may further include continuously or periodically monitoring parameters of an execution of the travel plan by way of at least the plurality of the sensors 40 (block 401) and at least one of updating historical records (block 402) and updating a social media file (block 403) based on results of the monitoring. Such monitoring may include a monitoring of the progress of the travel plan (i.e., where is the vehicle on the route-map?) and a monitoring of the passenger's experience to the extent that such monitoring is possible (i.e., is the passenger fidgety and seemingly uncomfortable?).

Figure 5:
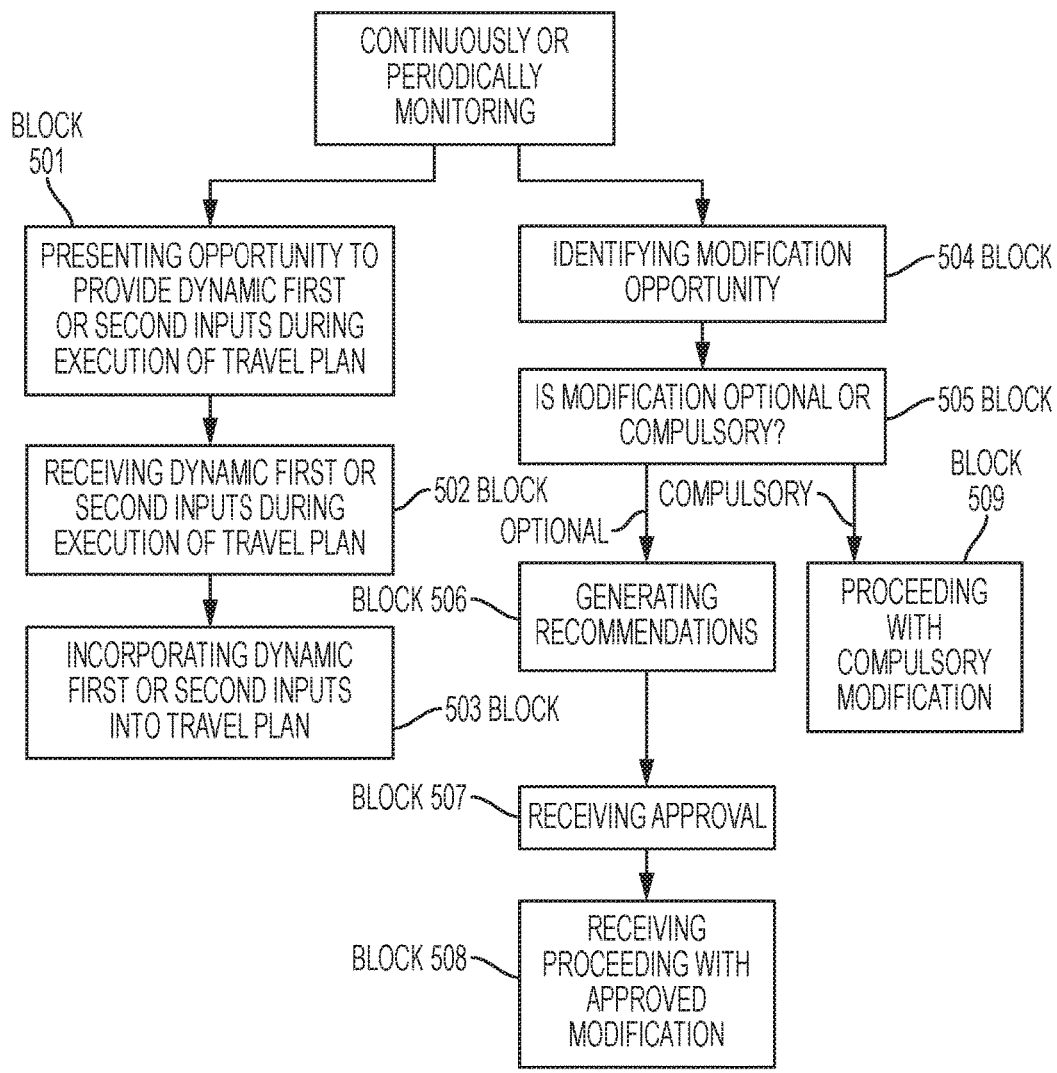
FIG. 5 is a flow diagram illustrating a method of operating an autonomous vehicle in accordance with further embodiments.

In accordance with further embodiments and with reference to FIG. 5, the monitoring of block 401 may include presenting a passenger or owner with an opportunity to provide at least one of dynamic first inputs and dynamic second inputs during an execution of the travel plan (block 501), receiving from the passenger or owner at least one of dynamic first inputs and dynamic second inputs during the execution of the travel plan (block 502) and incorporating the at least one of the dynamic first inputs and the dynamic second inputs into the travel plan (block 503).

In a parallel process, the monitoring of block 401 may include identifying that an opportunity to modify an execution of the travel plan is upcoming (block 504) and determining whether the opportunity to modify the execution of the travel plan is optional or compulsory (block 505). In the former case, as in when a point of potential interest comes into existence (e.g., an unscheduled local event begins along the route), the processor-implemented method may include generating recommendations for modifying the execution of the travel plan (block 506), receiving an approval for the modifications (block 507) and proceeding with the modifications upon receipt of the approval (block 508). On the other hand, if the opportunity is deemed to be compulsory as in the case of an accident that blocks the route, the processor-implemented method may include automatically proceeding with the modification (block 509).

Figure 6:
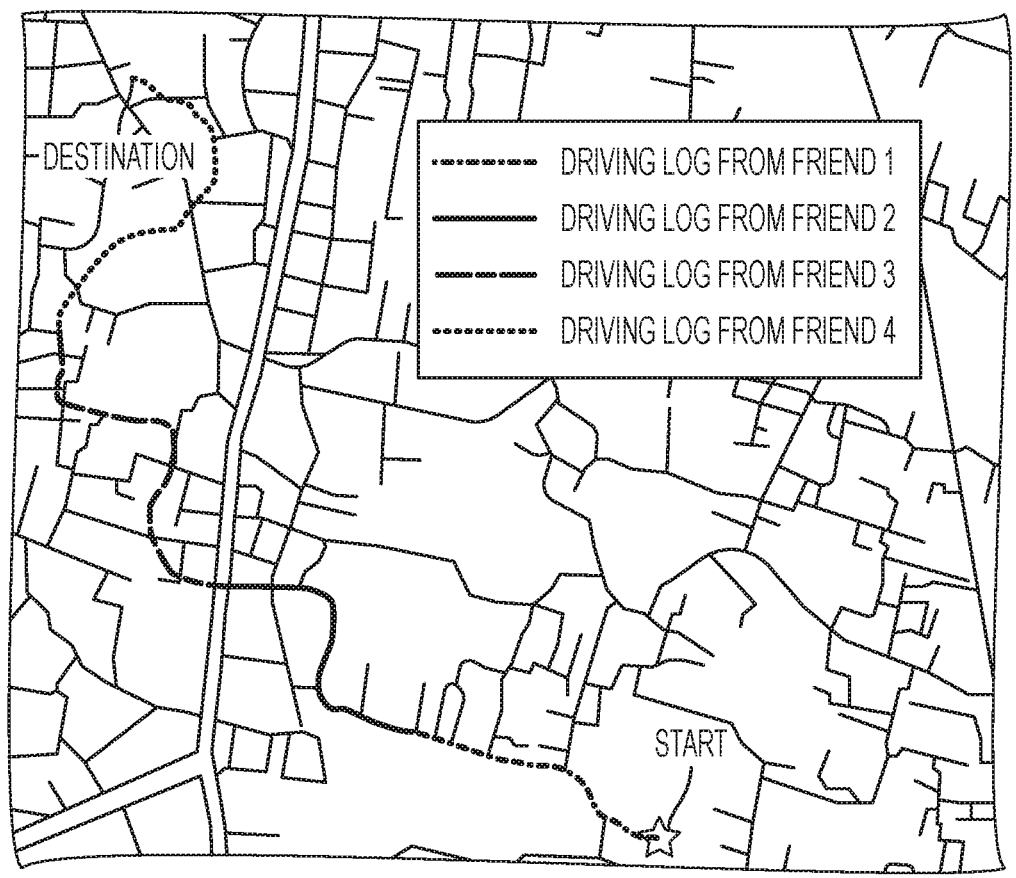
FIG. 6 is a top-down view of a map detailing an execution of a travel plan of an autonomous vehicle in accordance with embodiments.

With reference to FIG. 6, a particular execution of the processor-implemented method is illustrated. As shown in FIG. 6, the processing unit 51 of the computing device 50 of the autonomous vehicle 10 will gather tactical travel plan details, such as starting and ending points, time-frames, etc., and desired trip experience instructions from the passenger(s). The trip experience selections could be directly entered by the passenger(s) or derived from the passengers' driving log(s) and/or from his social network recommendations (of presumably like-minded friends). The trip experience selections may also include indications for reductions or increases in speed, switching on or off of the HVAC systems, closing or opening windows, playing music, halting in one or more places, etc. In addition, the trip experience selections may also include options to select one particular friend's driving experience, a group of friends' driving experience or a set of other user's driving experiences along the selected route. At a next point, aggregated driving experiences of different users may be displayed and, if there is a deviation in those driving experiences, thumbnail images of different user experiences may be displayed so that a current user can select an appropriate driving experience for him. Subsequently, the desired trip experience instructions will be gathered for all trip passengers and a travel plan will be plotted based on prioritized parameters and eventually executed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating an autonomous vehicle, the processor-implemented method comprising:
   receiving first input reflective of a route to be traveled and second input reflective of trip experience preferences comprising selections directly entered by passengers or selections derived from passenger driving logs, and selections derived from passenger social network recommendations, indications for reductions and increases in speed, switching on and off of heating, ventilation and air-conditioning systems, closing an opening windows, playing music and halting in one or more places;
   searching for driving experience data related to the route;
   aggregating the first and second inputs with the driving experience data; and
   plotting a travel plan incorporating the aggregated first and second inputs and the driving experience data.

2. The processor-implemented method of claim 1, wherein the searching comprises accessing cloud, centralized or distributed computing data.

3. The processor-implemented method of claim 1, wherein the aggregating comprises requesting at least one of additional first inputs and additional second inputs.

4. The processor-implemented method of claim 1, wherein:
   the processor-implemented method further comprises executing the travel plan responsive to the travel plan being approved,
   the executing of the travel plan comprises causing a processor to control operations of components of the autonomous vehicle based on sensor readings, and
   the components of the autonomous vehicle comprise wheels, an engine, an environmental control system and a cabin electrical system.

5. The processor-implemented method of claim 1, further comprising:
   monitoring parameters of an execution of the travel plan; and
   at least one of updating historical records and updating a social media file based on results of the monitoring of the parameters.

6. The processor-implemented method of claim 1, further comprising:
   receiving at least one of dynamic first inputs and dynamic second inputs during an execution of the travel plan; and
   incorporating the at least one of the dynamic first inputs and the dynamic second inputs into the travel plan.

7. The processor-implemented method of claim 1, further comprising:
   identifying that an opportunity to modify an execution of the travel plan is upcoming;
   determining whether the opportunity to modify the execution of the travel plan is optional or compulsory;
   generating recommendations for modifying the execution of the travel plan and proceeding with a modification upon approval in an event the opportunity to modify the execution of the travel plan is determined to be optional; and
   automatically proceeding with a modification in an event the opportunity to modify the execution of the travel plan is determined to be compulsory.

8. A non-transitory computer program product for operating an autonomous vehicle, the non-transitory computer program product comprising:
   a computer readable storage medium having program instructions embodied therewith, the program instructions executable by a processor to cause the processor to:
   receive first input reflective of a route to be traveled and second input reflective of trip experience preferences comprising selections directly entered by passengers or selections derived from passenger driving logs, and selections derived from passenger social network recommendations, indications for reductions and increases in speed, switching on and off of heating, ventilation and air-conditioning systems, closing an opening windows, playing music and halting in one or more places;
   search for driving experience data related to the route;
   aggregate the first and second inputs with the driving experience data; and
   plot a travel plan incorporating the aggregated first and second inputs and the driving experience data.

9. The non-transitory computer program product of claim 8, wherein the search comprises an accessing of cloud, centralized or distributed computing data.

10. The non-transitory computer program product of claim 8, wherein an aggregate comprises an issuance of a request for at least one of additional first inputs and additional second inputs.

11. The non-transitory computer program product of claim 8, wherein:
   the program instructions further causes the processor to execute the travel plan responsive to the travel plan being approved, an execution of the travel plan comprises causing the processor to control operations of components of the autonomous vehicle based on sensor readings, and the components of the autonomous vehicle comprise wheels, an engine, an environmental control system and a cabin electrical system.

12. The non-transitory computer program product of claim 8, wherein the program instructions further cause the processor to:

monitor parameters of an execution of the travel plan; and at least one of update historical records and update a social media file based on results of the monitoring of the parameters.

13. The non-transitory computer program product of claim 8, wherein the program instructions further cause the processor to:

receive at least one of dynamic first inputs and dynamic second inputs during an execution of the travel plan; and incorporate the at least one of the dynamic first inputs and the dynamic second inputs into the travel plan.

14. The non-transitory computer program product of claim 8, wherein the program instructions further cause the processor to:

identify that an opportunity to modify an execution of the travel plan is upcoming;

determine whether the opportunity to modify the execution of the travel plan is optional or compulsory;

generate recommendations for modifying the execution of the travel plan and proceed with a modification upon approval in an event the opportunity to modify the execution of the travel plan is determined to be optional; and automatically proceed with a modification in an event the opportunity to modify the execution of the travel plan is determined to be compulsory.

15. A system for operating an autonomous vehicle, the system comprising:

a processor; and a memory storing program instructions for operating the autonomous vehicle, the program instructions executable by a processor to cause the system to:

receive first input reflective of a route to be traveled and second input reflective of trip experience preferences comprising selections directly entered by passengers or selections derived from passenger driving logs, and selections derived from passenger social network recommendations, indications for reductions and increases in speed, switching on and off of heating, ventilation and air-conditioning systems, closing an opening windows, playing music and halting in one or more places;

search for driving experience data related to the route;

aggregate the first and second inputs with the driving experience data; and plot a travel plan incorporating the aggregated first and second inputs and the driving experience data.

16. The system of claim 15, wherein the search comprises an accessing of cloud, centralized or distributed computing data and an aggregate comprises an issuance of a request for at least one of additional first inputs and additional second inputs.

17. The system of claim 15, wherein:

the program instructions further cause the system to execute the travel plan responsive to the travel plan being approved, an execution of the travel plan comprises causing the processor to control operations of components of the autonomous vehicle based on sensor readings, and the components of the autonomous vehicle comprise wheels, an engine, an environmental control system and a cabin electrical system.

18. The system of claim 15, wherein the program instructions further cause the system to:

monitor parameters of an execution of the travel plan; and at least one of update historical records and update a social media file based on results of the monitoring of the parameters.

19. The system of claim 15, wherein the program instructions further cause the system to:

receive at least one of dynamic first inputs and dynamic second inputs during an execution of the travel plan; and incorporate the at least one of the dynamic first inputs and the dynamic second inputs into the travel plan.

20. The system of claim 15, wherein the program instructions further cause the system to:

identify that an opportunity to modify an execution of the travel plan is upcoming;

determine whether the opportunity to modify the execution of the travel plan is optional or compulsory;

generate recommendations for modifying the execution of the travel plan and proceed with a modification upon approval in an event the opportunity to modify the execution of the travel plan is determined to be optional; and automatically proceed with a modification in an event the opportunity to modify the execution of the travel plan is determined to be compulsory.

* * * * *